United States Patent [19]

Dinkelacker et al.

[11] 4,277,752

[45] Jul. 7, 1981

[54] DEVICE FOR TESTING IGNITION SYSTEM OF A COMBUSTION ENGINE

[75] Inventors: Walter Dinkelacker, Stuttgart; Jüergen Knöedler, Remshalden-Grunbach, both of Fed. Rep. of Germany

[73] Assignee: Robert Bosch GmbH, Stuttgart, Fed. Rep. of Germany

[21] Appl. No.: 17,138

[22] Filed: Mar. 5, 1979

[30] Foreign Application Priority Data

Mar. 17, 1978 [DE] Fed. Rep. of Germany ....... 2811573

[51] Int. Cl.³ ............ G01M 19/02

[52] U.S. Cl. ............ 324/399

[58] Field of Search ............ 324/378, 384, 399

[56] References Cited

U.S. PATENT DOCUMENTS 2,188,845 1/1940 Ramsay ............ 324/399

*Primary Examiner*—Ernest F. Karlsen

*Attorney, Agent, or Firm*—Michael J. Striker

[57] ABSTRACT

The device for testing an ignition system of a combustion engine comprises an adjustable load connected in the primary winding of the ignition coil by means of which the stored energy is so long reduced until due to the deficient energy the first ignition slip of the fuel-air-mixture occurs. This reduced energy is compared with the nominal or normal energy required for proper operation of the ignition system and the difference between the two values determines a measure for ignition energy reserve and consequently a measure for the condition of the whole ignition system. The energy reserve is measured selectively always for a part of the ignition system, that means for a cylinder of the engine. For this purpose a selective switch is employed using a scaler fed by pulses derived from the contact breaker and synchronized by a pulse from the part of the cylinder under test produce an output pulse which connects the loading member to the primary winding of the ignition coil.

5 Claims, 5 Drawing Figures

DEVICE FOR TESTING IGNITION SYSTEM OF A COMBUSTION ENGINE

BACKGROUND OF THE INVENTION

This invention relates generally to a tester for testing the condition of an ignition system of a combustion engine and more particularly it relates to a tester of the type which reduces the electrical energy stored in the primary winding of an ignition coil until an ignition slip or miss occurs.

A tester of this type is known from prior art in which an electrical load is connected in the primary circuit of the ignition coil. Power loss of this load is increased so long until the first ignition slip caused by the lack of energy takes place during the igniting process of the gas air mixture in the combustion spaces of the engine. At the moment of occurrence of this ignition slip the available ignition energy is ascertained and compared with a reference value which is characteristic for the normal operation of a tested ignition system whereby the difference between the two values indicates a measure for the reserve of the ignition energy and thus the condition of the whole ignition system. The disadvantage of this known testing device is the limitation that only the ignition system as a whole can be tested or in other words that it can be ascertained only whether the ignition system is in good working order or not. Accordingly this known device enables only a coarse estimate of the condition of the igniting system and in the case of a deviation from a nominal value the component parts of the system have to be individually tested.

SUMMARY OF THE INVENTION

It is therefore a general object of the present invention to overcome the aforementioned disadvantage.

More particularly, it is an object of the present invention to provide an improved ignition tester of the above-described type in which the parts of the ignition system assigned to respective cylinders of the combustion engine can be selectively checked in order to determine in which individual circuit of the ignition system the trouble takes place, for example, before or after the distributor, and in the case when the fault is after the distributor in which branch of the distributing circuit.

In keeping with these objects and others which will become apparent hereafter, one feature of the invention resides, in a tester of an ignition system having a power source, an ignition coil, a plurality of sparking plugs and a distributor for successively connecting respective plugs to the coil, in a combination which comprises means for adjustably reducing electrical energy normally stored in the coil, and selective switching means controlled by successively activated parts, for connecting the energy reducing means to the coil circuit when a sparking action in the plug under test is initiated.

In the preferred embodiment of this invention, the selective switch includes a scaler or counter which produces an output pulse for a predetermined number of input pulses derived from the actuation of respective sparking plugs and this output pulse switches the energy reducing means to the primary circuit of the ignition coil.

It is also of particular advantage when instead of an electrically passive load which is adjustable for reducing electrical energy stored in the primary circuit of the ignition coil, an adjustable power source is employed so that the energy supply for the ignition system can be adjusted for ready use to such an extent until first ignition slip in a preselected cylinder of the combustion engine takes place.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
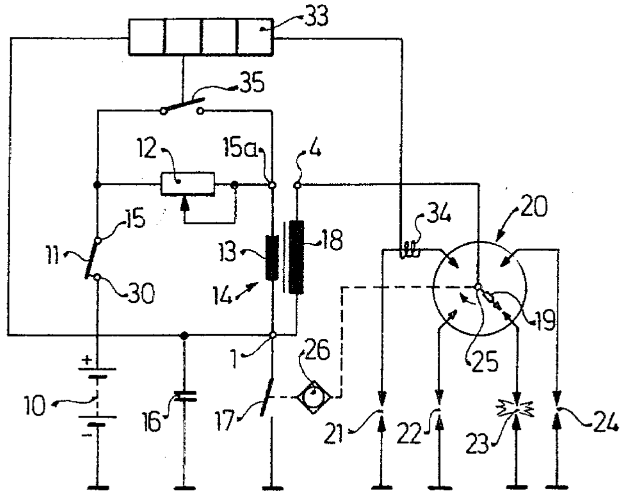
FIG. 1 is a schematic circuit diagram of an ignition system of a four cylinder combustion engine including the testing device of the invention.

Referring firstly to FIG. 1, the ignition system of a combustion engine includes a power source 10 of an operative voltage which is connected at one pole thereof to the ground conductor and at the other pole to a contact 30 of power switch 11. The other contact 15 of switch 11 is connected via an adjustable resistor 12 to a terminal 15*a* of the primary winding 13 of ignition coil 14. The other terminal 1 of the primary winding 13 is connected via contact breaker 17 to the ground conductor, the contact breaker 17 being bridged by ignition capacitor 16. Terminal 1 is also connected to the secondary winding 18 of coil 14 whereby the other terminal 4 of the secondary winding 18 is connected to the rotary finger 19 of distributor 20. The distributor 20 distributes the energy stored in ignition coil 14 between sparking plugs 21 through 24 of the engine. A non-illustrated crank shaft of the engine drives the rotary finger 19 of the distributor and a cam 26 which controls the make-and-brake contact 17. The terminal 1 is further connected to the input of a switching multistage counter or scaler 33 which acts as a selective switch in such a manner that it delivers an output impulse from a preselected stage when a predetermined number of input pulses corresponding to each actuation of contact breaker 17 is completed. Scaler 33 is also controlled by means of a synchronizing pulse generated in a pick-up 34 which is coupled to a branch conduit of distributor 20 corresponding to a preselected sparking plug. The sparking plug 21 is assigned for example to the first cylinder of the combustion engine. By means of the synchronization pulse from pick-up 34 the scaler 33 is synchronized with the cycles of rotary arm 19 of distributor 20. The output pulse from scaler 33 opens a switch 35 which is connected between contacts 15 and 15*a* parallel to the adjustable resistor 12 and thus reduces the normal current through the primary winding 13 of coil 14.

The principle of operation of the ignition system as illustrated in FIG. 1 is as follows: At closed contact breaker 17, the primary winding 13 of coil 14 is connected via closed switches 35 and 11 to the power source or battery 10 and a current $I_p$ flows through the primary winding. This current does not increase suddenly in response to the closing of contact breaker 17 but with a time delay relative to the application of the battery voltage and gradually raise to a certain end value, the so-called rest current value determined by the ohmic resistance of the primary winding 13. During the increased flow of the current a magnetic field builds up in the primary winding and an electric energy is stored in the latter. Upon completion of the storing process contact breaker 17 opens and interrupts the primary rest current. At the same instant the magnetic field breaks down and by induction generates both in the primary winding and in the secondary winding 18 a voltage which is the higher the faster the magnetic field breaks down. The speed of the collapse of the magnetic field is assisted by condensor 16 which is connected parallel to the contact breaker 17. The high voltage induced in the secondary winding 18 is applied via the distributing finer 19 of the distributor 20 to individual sparking plugs 21 through 24 whereby the resulting ignition spark successively ignites the fuel-air-mixture in combustion spaces of the engine.

Figure 2:
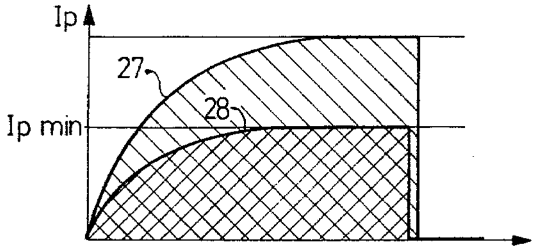
FIG. 2 is a plot diagram of the primary current of the ignition coil versus time in the circuit of FIG. 1.

In FIG. 2 there is plotted a diagram of the primary current $I_p$ against time T. When the ignition system is in a good working order, the rise of the primary current corresponds to the curve 27 whereby the ignition energy $W_Z$ stored in the coil 14 at a time point t is $$W_Z = \frac{1}{2} L_s I^2{}_t$$

which in a workable ignition system is fully available. L indicates the inductivity of the primary winding 13 of coil 14.

If in the circuit of FIG. 1 the adjustable resistance 12 is increased from zero, then a voltage drop takes place on the resistor 12 which during a time interval t of the current flow represents a power loss. Experiments have shown that by increasing this series resistance the performance of the engine remains initially constant and that only at a certain minimum current $I_p$ will the performance abruptly drop. Consequently if the primary current $I_p$ flowing through the primary winding 13 of coil 14 is continuously reduced so the available ignition energy stored in the coil is also reduced and when the first ignition slip caused by the lack of available energy occurs that means when the performance of the engine starts to slip so this available ignition energy is ascertained and compared with a nominal value of the ignition energy, namely with a stored energy value at which the ignition system operates reliably. From the difference between the two energy values there results so-called reserve of the ignition energy which is a measure for the condition of the whole ignition system.

Curve 28 in FIG. 28 illustrated the time plot of the current through the primary winding 13 of coil 14 at a time point when the first ignition slip takes place. This characteristic curve of the primary current indicates according to the equation $W_Z = \frac{1}{2} L_s I^2{}_t$ the minimum applicable ignition energy for the particular ignition system. The difference between this minimum energy and the normal energy is the aforementioned ignition energy reserve which gives an information about the condition of the system. If this difference is large or if it exceeds a predetermined value, so the ignition system is in a good working order. If the ignition energy reserve is too small and if it is below the predetermined nominal value then the condition of the ignition system is not in order.

By means of scaler 33 and by switch 35 controlled by the scaler, the ignition energy in coil 14 can be reduced only then when fuel-air mixture in a preselected cylinder of the engine is about to ignite. For this purpose scaler 33 is synchronized with the actuation order of individual cylinders of the combustion engine by means of a probe or pick-up 34 coupled for example to a lead-in wire for a plug pertaining to the first cylinder of the engine. The pick-up 34 generates a synchronization pulse which is applied to the scaler 33 and sets the same to zero or to 1 when the sparking of the plug pertaining to the first cylinder takes place. With each actuation of contact breaker 17, a pulse is delivered to the counting input of scaler 33 and is transferred therein about a counting place whereby upon reaching a predetermined number of the input pulses the scaler produces an output pulse which opens the normally closed switch 35. In doing so, the hitherto short-circuited adjustable resistor 12 becomes effective and the stored ignition energy is reduced according to the setting of the tapping arm of the resistor 12. In this manner it is possible selectively to find out the ignition energy reserve for the part of the ignition system pertaining to the selected cylinder of the combustion engine. In addition, apart from the exact pinpointing of the trouble in the ignition system itself, it is also possible to determine whether the failure is before the distributor 20 or behind the latter.

Figure 3:
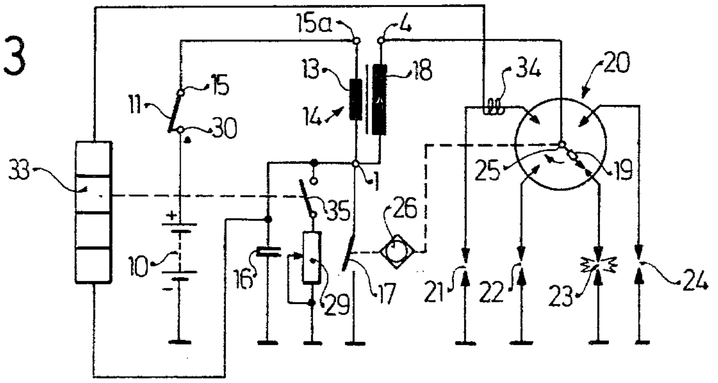
FIG. 3 is another embodiment of the testing device of this invention.

FIG. 3 shows a similar ignition system as FIG. 1 and therefore the description of operation of its individual components parts is omitted for the sake of simplicity. Instead of resistor 12 which in the preceding example of FIG. 1 has been connected in series with the primary winding of ignition coil 14, in the embodiment according to FIG. 3 there is provided an adjustable resistor 29 which is connected parallel to the contact breaker 17. The resistor 29 reduces the ignition energy delivered to sparking plugs 21 through 24 in such a manner that by reducing the value of the resistor 29 the rest current flowing through the primary winding 13 of coil 14 becomes larger.

Figure 4:
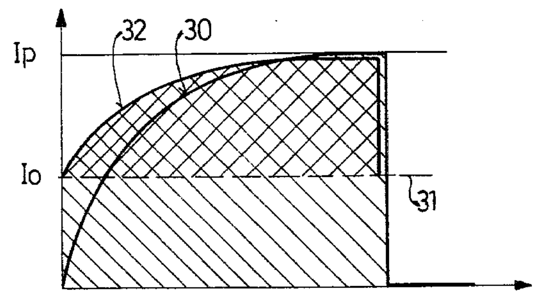
FIG. 4 is a plot diagram of primary current versus time in the modification of FIG. 3.

The operation of this embodiment is explained with reference to FIG. 4 where curve 30 indicates the plotting of the primary current $I_t$ versus time when an infinitely large resistor 29 is adjusted. If the resistor 29 is reduced then a rest current $I_O$ flows through the primary winding as indicated by broken line 31. As a consequence the primary current does not start raising to its maximum value from a normally negligible rest current but starts from the value $I_O$ and its time development is indicated by the characteristic curve 32. The values readable from the curves 30 or 32 represent the available ignition energy. If the adjustable resistor 29 and thus the available ignition energy is set to such a value at which the first ignition slip occurs, then this value corresponds to the minimum energy which is necessary for functioning of the ignition system. The ignition energy reserve can be again ascertained from the difference between the minimum ignition energy and an energy value which is prescribed for optimum operation of a given ignition system, that is a maximum ignition energy, the ignition energy reserve cannot be determined. Also in this modification a simple good-bad indication of the condition of the ignition system of the engine is possible. Similarly as in the embodiment of FIG. 1, also in this example the scaler 33 is synchronizable by a trigger pulse pick-up or generator 34 and the scaler actuates switch 36 which in this embodiment is in series with the adjustable resistor 29. Normally the switch 36 is open so that the adjustable resistor 29 has no effect on the operation of the ignition system. The cylinders of the combustion engine are assigned to respective counting places or stages of scaler 33 and by initiating the firing of a selected cylinder the switch 36 is closed and as a result the energy available from the primary winding of the coil is diminished. By virtue of the reduction of the ignition energy at a time point at which fuel-air mixture in a predetermined cylinder of the engine is about to be ignited it can be ascertained whether the part of the ignition system assigned to this particular cylinder is in order or whether a trouble before or after distributor 20 takes place. By switching the stages of scaler 33 that means by actuating the switch 36 by a different output pulse of the scaler 33 it is possible to test the remaining cylinders of the engine or the branches of the ignition circuit pertaining to these respective cylinders.

Figure 5:
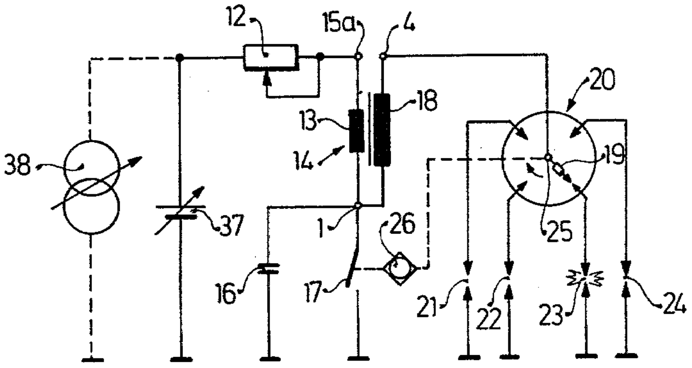
FIG. 5 shows an adjustable power source for controlling the stored energy in the primary circuit of the ignition coil.

FIG. 5 illustrates the same ignition system as in FIG. 1. Instead of an adjustable resistor in the primary winding, however, there is employed an adjustable power source, that is an adjustable source of voltage 37 or as indicated by broken lines, an adjustable current source 38 by means of which the energy in the coil 14 is reduced. In this embodiment instead of changing the adjustable resistor 12 or 29 the energy supply is reduced by reducing the voltage of voltage source 37 or supply current from current source 38 to a point at which the first ignition slips occur. By means of such an adjustable power source 37 or 38 it is possible to ascertain not only the ignition energy reserve of the whole ignition system but also to find out selectively the condition of individual parts of the circuit provided of course that the system is provided with the scaling and switching devices 33 and 35 as illustrated in FIGS. 1 and 3 for reducing the ignition energy only at preselected cylinders of the engine.

It will be understood that each of the elements described above, or two or more together, may also find a useful application in other types of constructions differing from the types described above.

While the invention has been illustrated and described as embodied in specific examples of ignition testing devices, it is not intended to be limited to the details shown since various modifications and structural changes may be made without departing in any way from the spirit of the present invention.

What is new and desired to be protected by Letters Patent is set forth in the appended claims:

1. A device for testing an ignition system of a combustion engine having an electrical power source, an ignition coil connectable to said power source, a plurality of spark plugs each associated to a respective cylinder, a distributor for successively connecting respective plugs to said coil and means for variably reducing the energy of the ignition coil, comprising switching means for selectively testing the efficiency of each respective cylinder, said switching means including a scaler having a plurality of stages assigned respectively to corresponding cylinders of the engine, a synchronization input coupled to a preselected cylinder to set the scales to a starting condition when the ignition process in said preselected cylinder is about to be initiated, a counting input controlled by the pulses derived from the activation of respective cylinders of the engine, an output for delivering an output pulse when a predetermined number of input pulses has been attained, and a switching member controlled by said output pulse and controlling the energy reducing means.

2. The device as defined in claim 1, wherein said ignition coil has a primary winding and a secondary winding, said energy reducing means being connected in series with said primary winding.

3. The device as defined in claim 1, wherein said ignition system further includes contact breaking means, said energy reducing means being connected in parallel to said contact breaking means.

4. The device as defined in claim 1, said ignition energy reducing means including an adjustable power source for reducing the energy supplied to said ignition coil when the ignition process in a preselected cylinder is to be initiated.

5. A device for testing an ignition system of a combustion engine having an electrical power source, an ignition coil connectable to said power source, a plurality of spark plugs each associated to a respective cylinder, a distributor for successively connecting respective plugs to said coil and means for variably reducing the energy of the ignition coil, comprising switching means for selectively testing the efficiency of each respective cylinder by connecting the energy reducing means to the coil to reduce the ignition energy stored in the coil when the ignition process in the respective cylinder is about to be initiated, said selective switching means including a scaler having a plurality of stages assigned respectively to corresponding cylinders of the engine, a synchronization input coupled to a preselected cylinder to set the scaler to a starting condition when the ignition process in said preselected cylinder is about to be initiated, a counting input controlled by the pulses derived from the activation of respective cylinders of the engine, an output for delivering an output pulse when a predetermined number of input pulses has been attained, and a switching member controlled by said output pulse and controlling the energy reducing means.

* * * * *